United States Patent
Nakada

(10) Patent No.: US 12,449,646 B2
(45) Date of Patent: Oct. 21, 2025

(54) OPTICAL SYSTEM AND IMAGE PICKUP APPARATUS HAVING THE SAME

(71) Applicant: CANON KABUSHIKI KAISHA, Tokyo (JP)

(72) Inventor: Takeharu Nakada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 18/148,349

(22) Filed: Dec. 29, 2022

(65) Prior Publication Data

US 2023/0213745 A1 Jul. 6, 2023

(30) Foreign Application Priority Data

Jan. 1, 2022 (JP) ................................. 2022-000018

(51) Int. Cl.
- *G02B 15/22* (2006.01)
- *G02B 13/02* (2006.01)
- *G02B 15/14* (2006.01)

(52) U.S. Cl.
CPC ............. *G02B 15/22* (2013.01); *G02B 13/02* (2013.01); *G02B 15/143105* (2019.08)

(58) Field of Classification Search
CPC ................... G02B 15/22; G02B 13/02; G02B 15/143105; G02B 13/00; G02B 13/18; G02B 15/20

See application file for complete search history.

(56) References Cited

U.S. PATENT DOCUMENTS

| 6,115,188 A * | 9/2000 | Nishio ........... G02B 15/143105 359/557 |
| 6,381,079 B1 * | 4/2002 | Ogawa ................... G02B 13/02 359/569 |

FOREIGN PATENT DOCUMENTS

| JP | 2013097212 A | 5/2013 |
| JP | 2015-215560 A | 12/2015 |
| JP | 2016148793 A | 8/2016 |
| JP | 2016180896 A | 10/2016 |

\* cited by examiner

*Primary Examiner* — Bumsuk Won
*Assistant Examiner* — Ray Alexander Dean
(74) *Attorney, Agent, or Firm* — Canon U.S.A., Inc. IP Division

(57) ABSTRACT

An optical system includes, in order from an object side, a first lens unit having positive refractive power, a second lens unit having negative refractive power, and a third lens unit having positive refractive power. A distance between adjacent lens units changes during focusing. During focusing from an infinity object to the closest object, the first and third lens units do not move and the second lens unit moves toward the image side. The third lens unit consists of, in order from the object side, a first subunit having positive refractive power, a second subunit having negative refractive power, and a third subunit having positive refractive power. The second subunit moves in a direction including a component in a direction orthogonal to an optical axis during image stabilization. The second subunit includes positive and negative lenses. A predetermined condition is satisfied.

21 Claims, 9 Drawing Sheets

OPTICAL SYSTEM AND IMAGE PICKUP APPARATUS HAVING THE SAME

BACKGROUND

Technical Field

One of the aspects of the disclosure relates to an optical system, and is suitable for a digital video camera, a digital still camera, a broadcasting camera, a film-based camera, a surveillance camera, an in-vehicle camera, and the like.

Description of the Related Art

A telephoto type optical system (telephoto lens) that includes an image stabilizing unit configured to perform image stabilization (correct image blur) has conventionally been proposed (see Japanese Patent Laid-Open No. JP 2015-215560).

The telephoto lens that includes the image stabilizing unit is demanded for both miniaturization and high image stabilizing performance. The telephoto lens that includes the image stabilizing unit disclosed in JP 2015-215560 can secure the image stabilizing performance by disposing the image stabilizing unit at a position slightly distant from an image plane position toward an object.

SUMMARY

An optical system according to one aspect of the disclosure includes, in order from an object side to an image side, a first lens unit having positive refractive power, a second lens unit having negative refractive power, and a third lens unit having positive refractive power. A distance between adjacent lens units changes during focusing. During focusing from an infinity object to the closest object, the first and third lens units do not move and the second lens unit moves toward the image side. The third lens unit consists of, in order from the object side to the image side, a first subunit having positive refractive power, a second subunit having negative refractive power, and a third subunit having positive refractive power. The second subunit moves in a direction including a component in a direction orthogonal to an optical axis during image stabilization. The second subunit includes a positive lens and a negative lens. The following inequalities are satisfied:

$$1.85 < N3b\_ave$$

$$f3b/f < -0.25$$

where $N3b\_ave$ is an average value of refractive indices of all lenses included in the second subunit, $f3b$ is a focal length of the second subunit, and $f$ is a focal length of the optical system. An image pickup apparatus having the above optical system also constitutes another aspect of the disclosure.

Further features of the disclosure will become apparent from the following description of exemplary embodiments with reference to the attached drawings.

DESCRIPTION OF THE EMBODIMENTS

Figure 1:
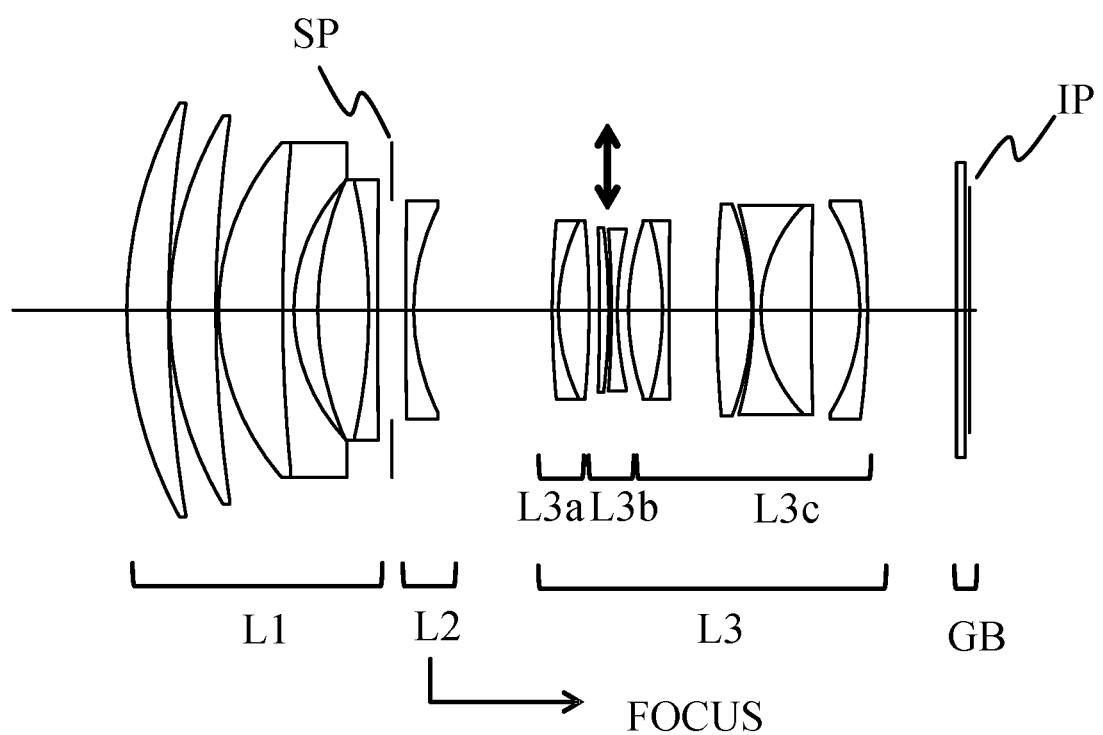
FIG. 1 is a sectional view of an optical system according to Example 1 in an in-focus state on an infinity object.
Figure 2A:
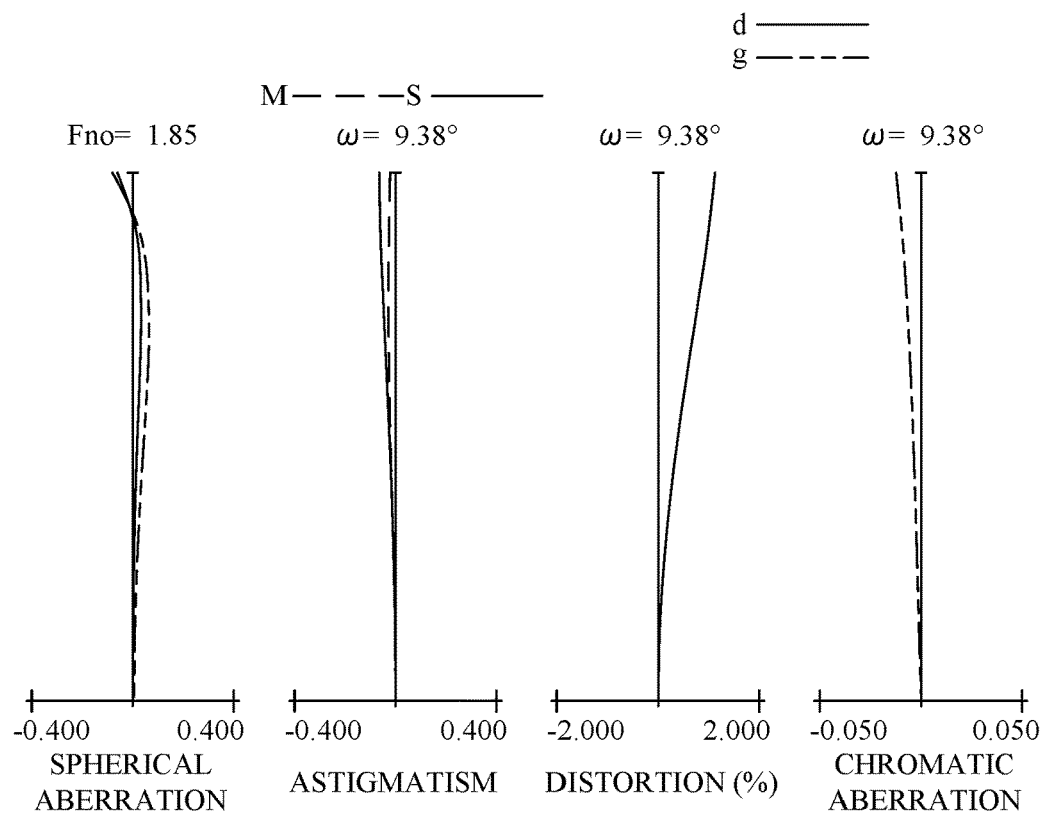
FIGS. 2A and 2B are aberration diagrams of the optical system according to Example 1 in the in-focus state on the infinity object and in an in-focus state on the closest object, respectively.
Figure 2B:
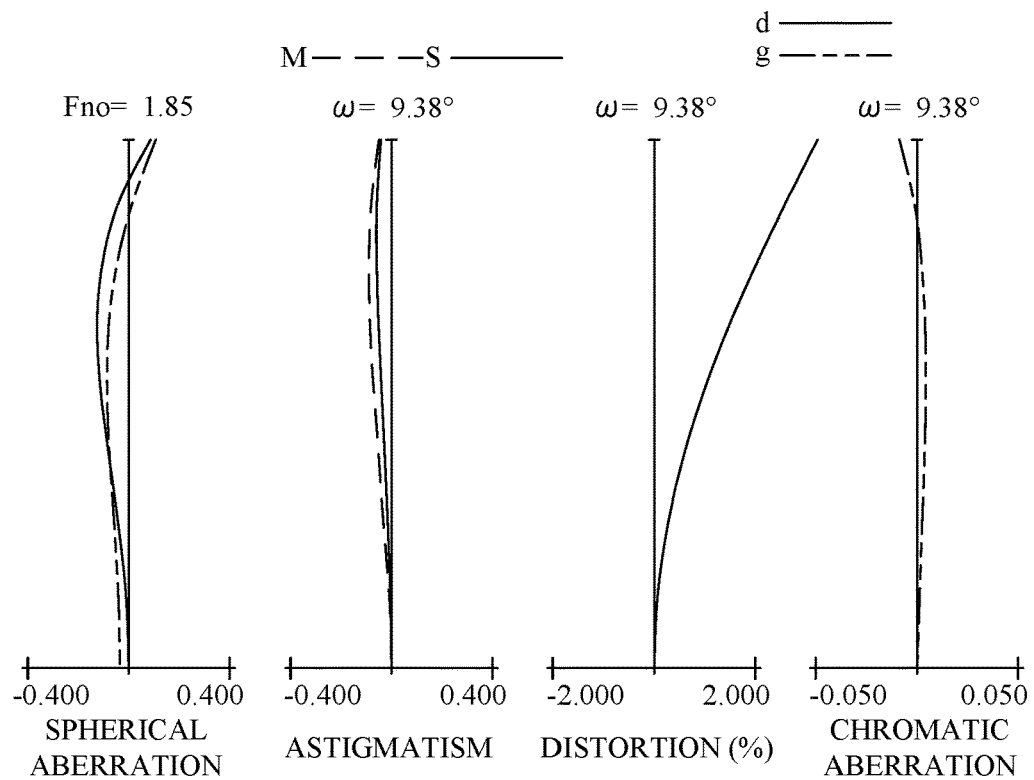
Figure 3:
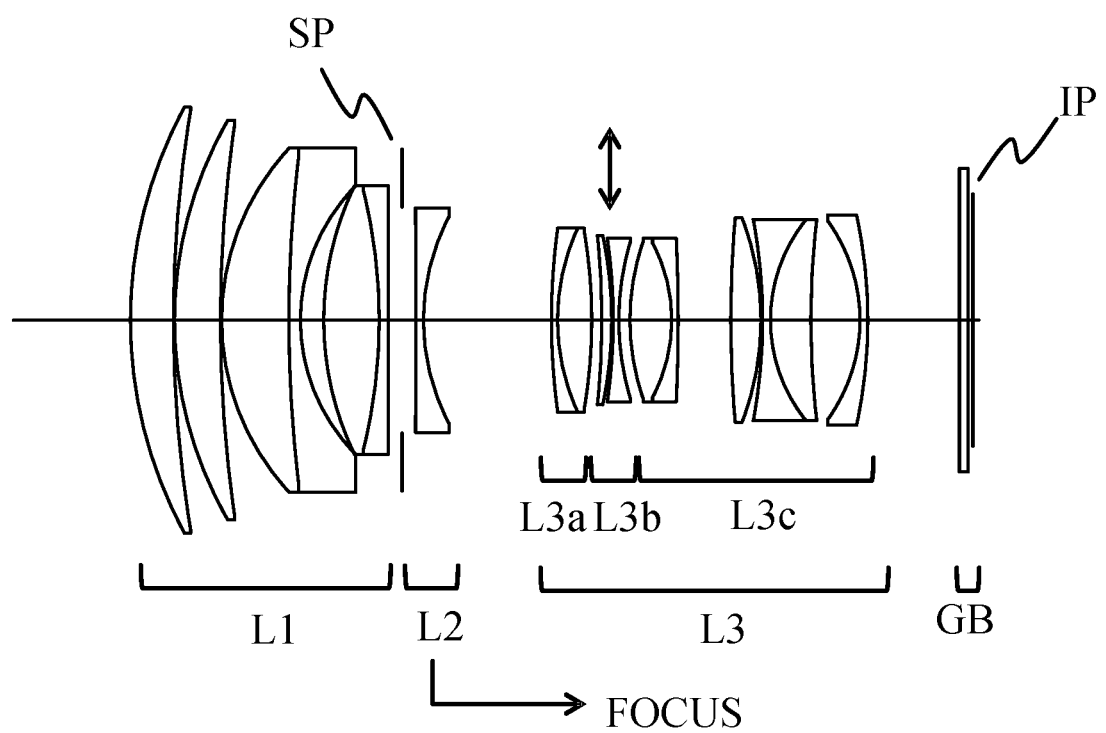
FIG. 3 is a sectional view of an optical system according to Example 2 in an in-focus state on an infinity object.
Figure 4A:
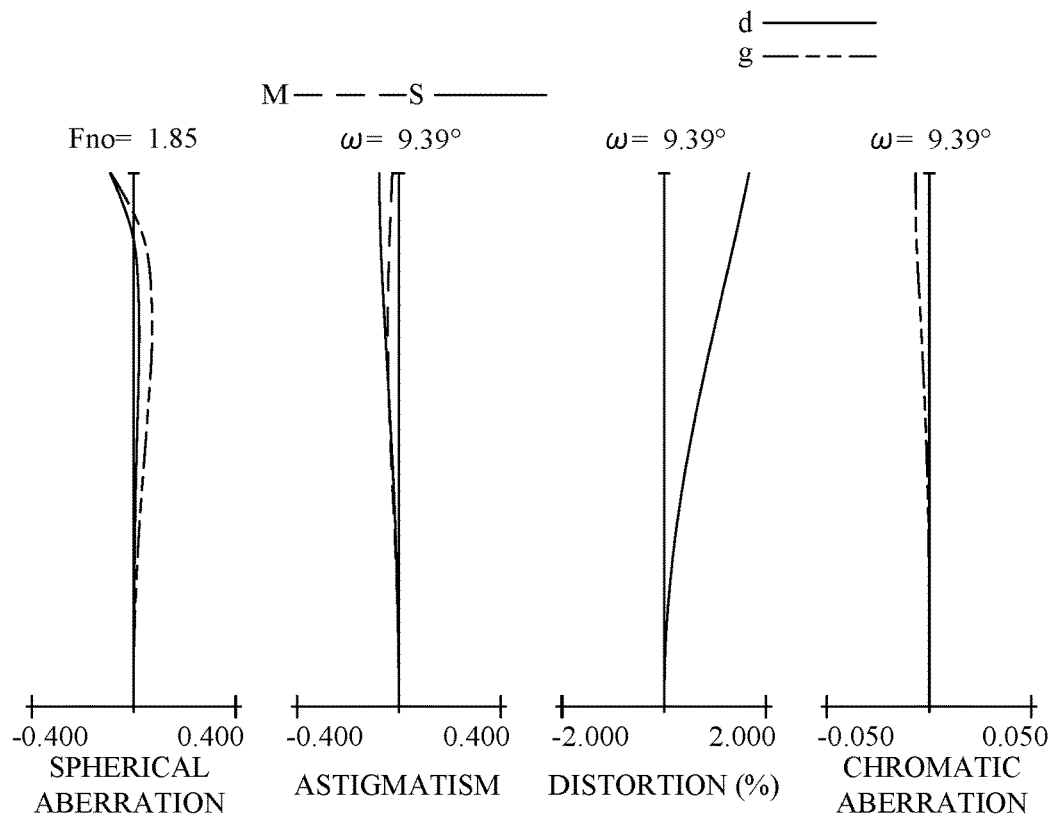
FIGS. 4A and 4B are aberration diagrams of the optical system according to Example 2 in the in-focus state on the infinity object and in an in-focus state on the closest object, respectively.
Figure 4B:
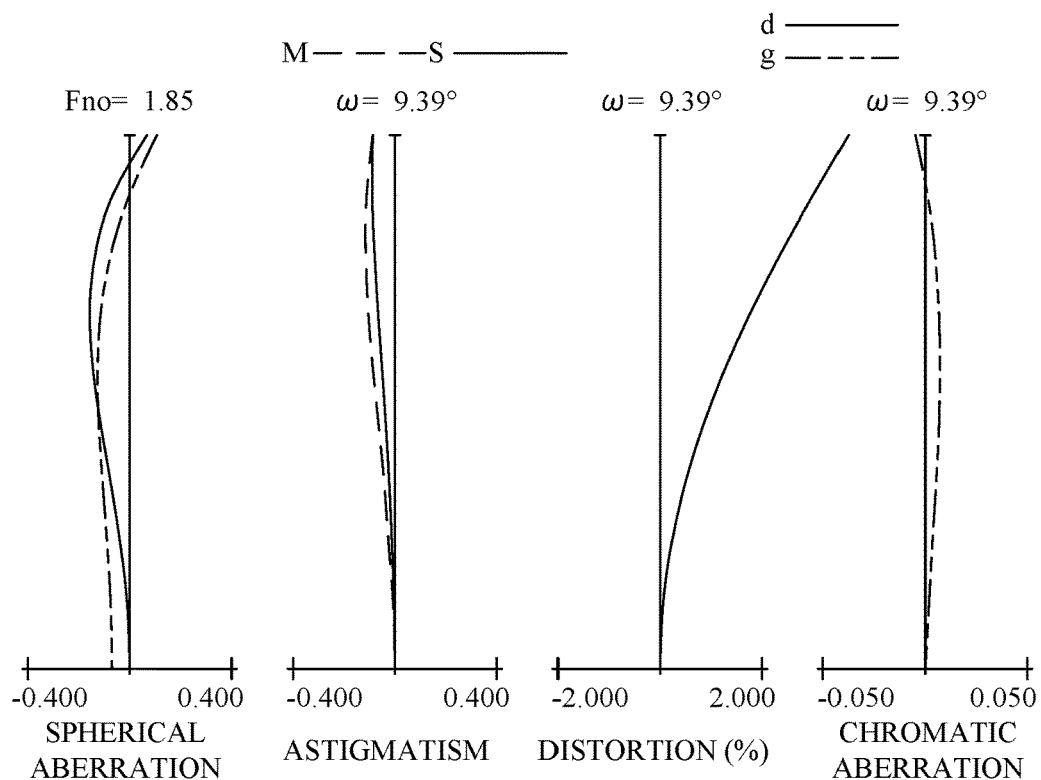
Figure 5:
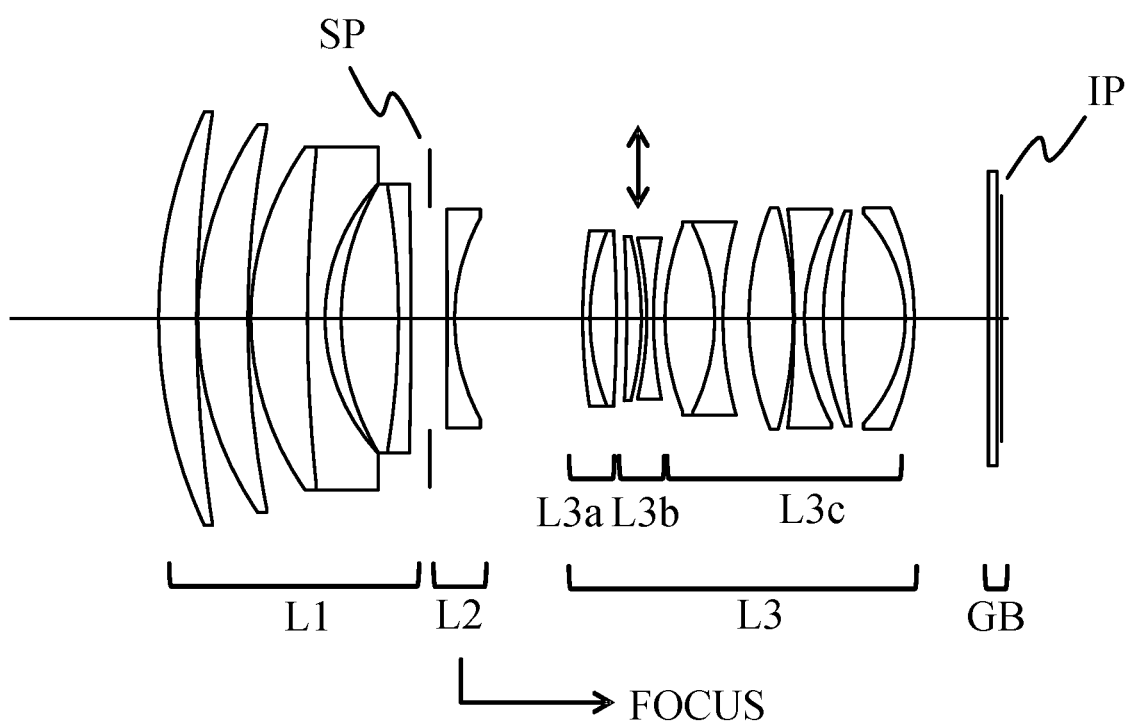
FIG. 5 is a sectional view of an optical system according to Example 3 in an in-focus state on an infinity object.
Figure 6A:
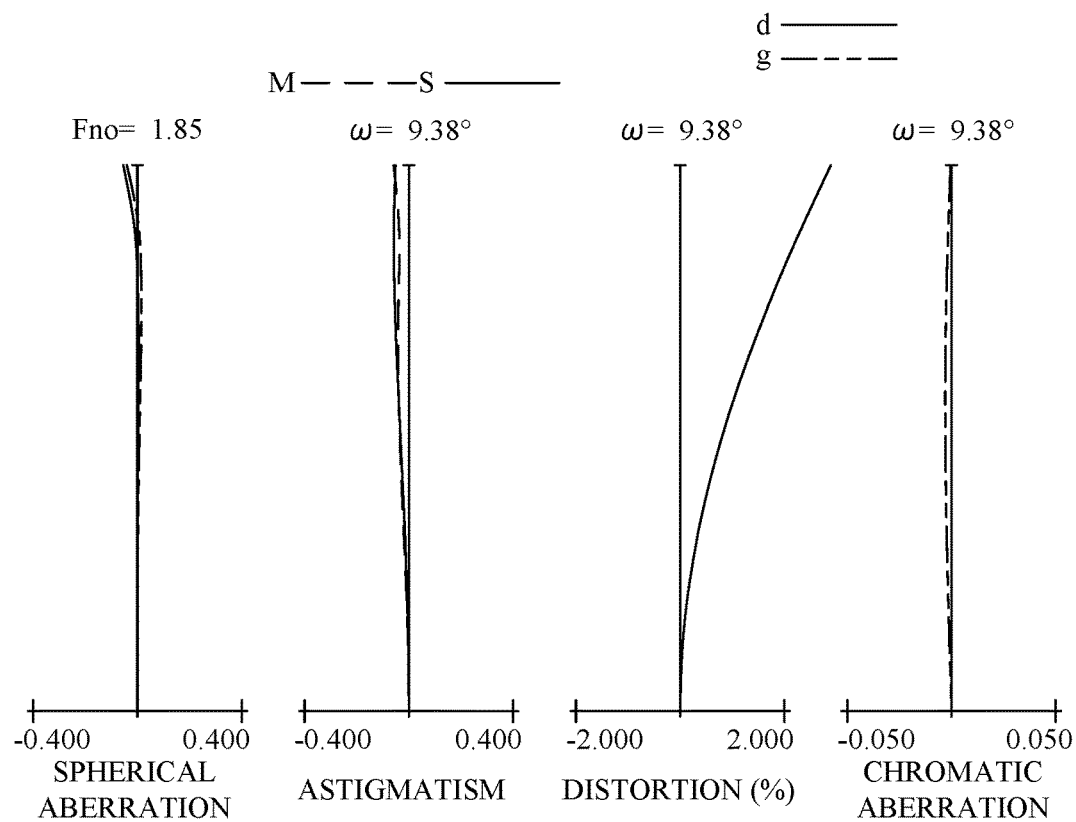
FIGS. 6A and 6B are aberration diagrams of the optical system according to Example 3 in the in-focus state on the infinity object and in an in-focus state on the closest object, respectively.
Figure 6B:
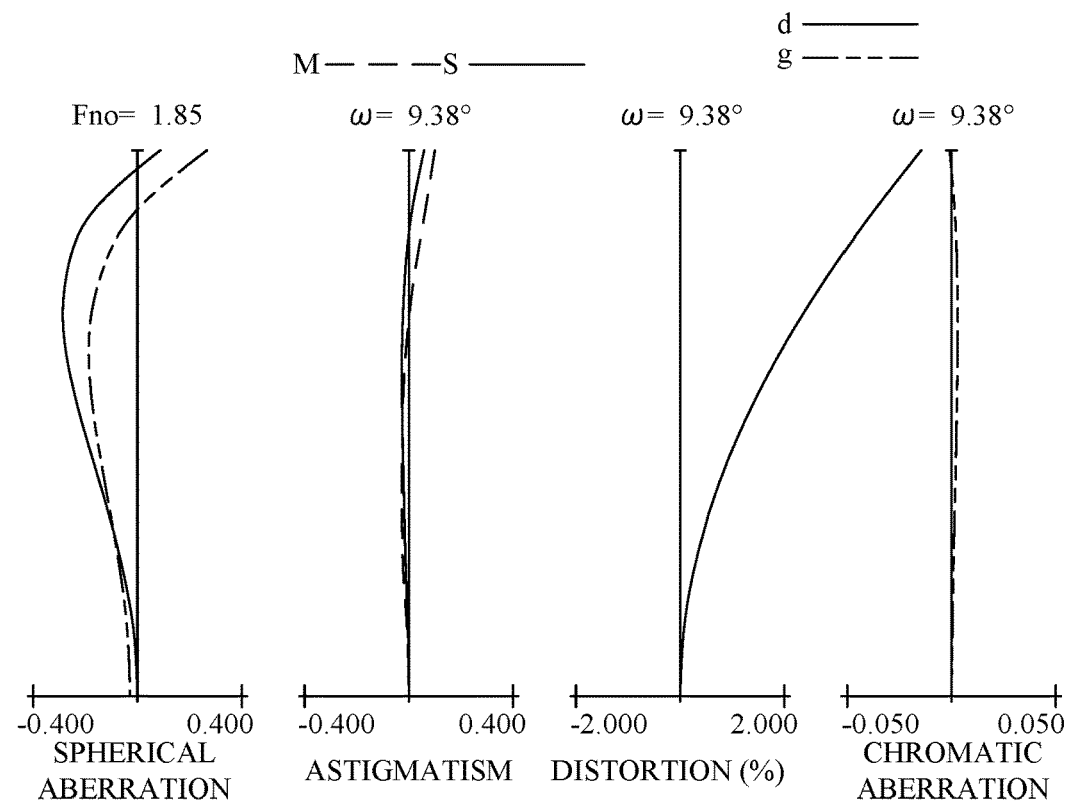
Figure 7:
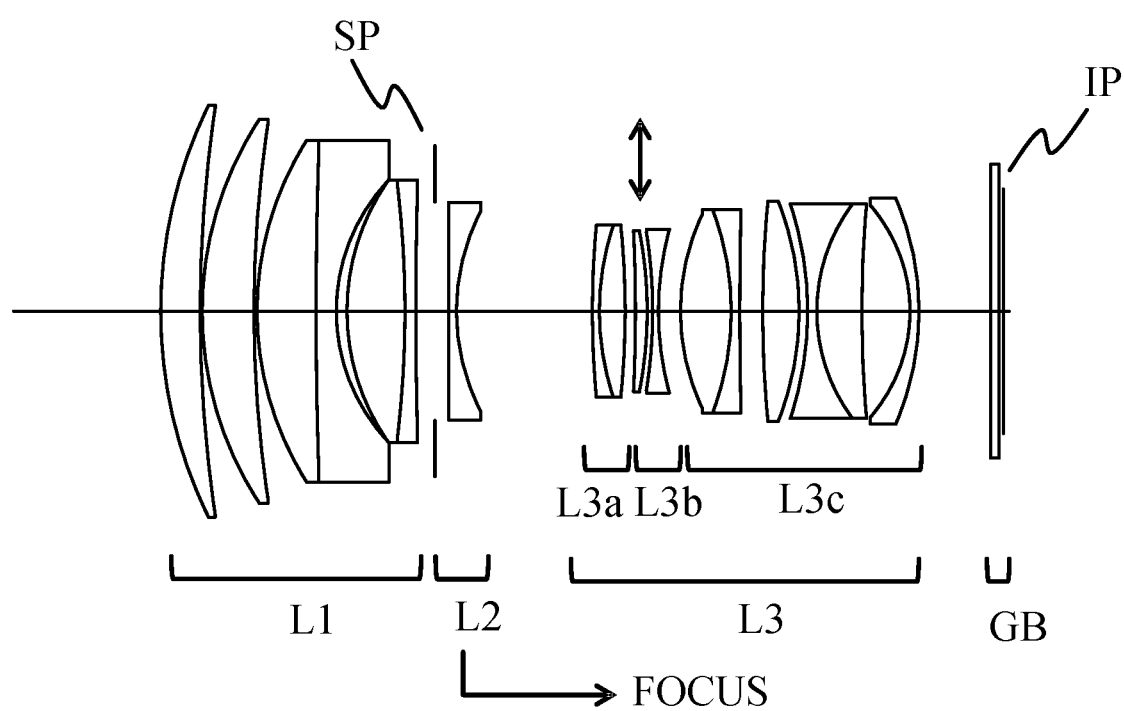
FIG. 7 is a sectional view of an optical system according to Example 4 in an in-focus state on an infinity object.
Figure 8A:
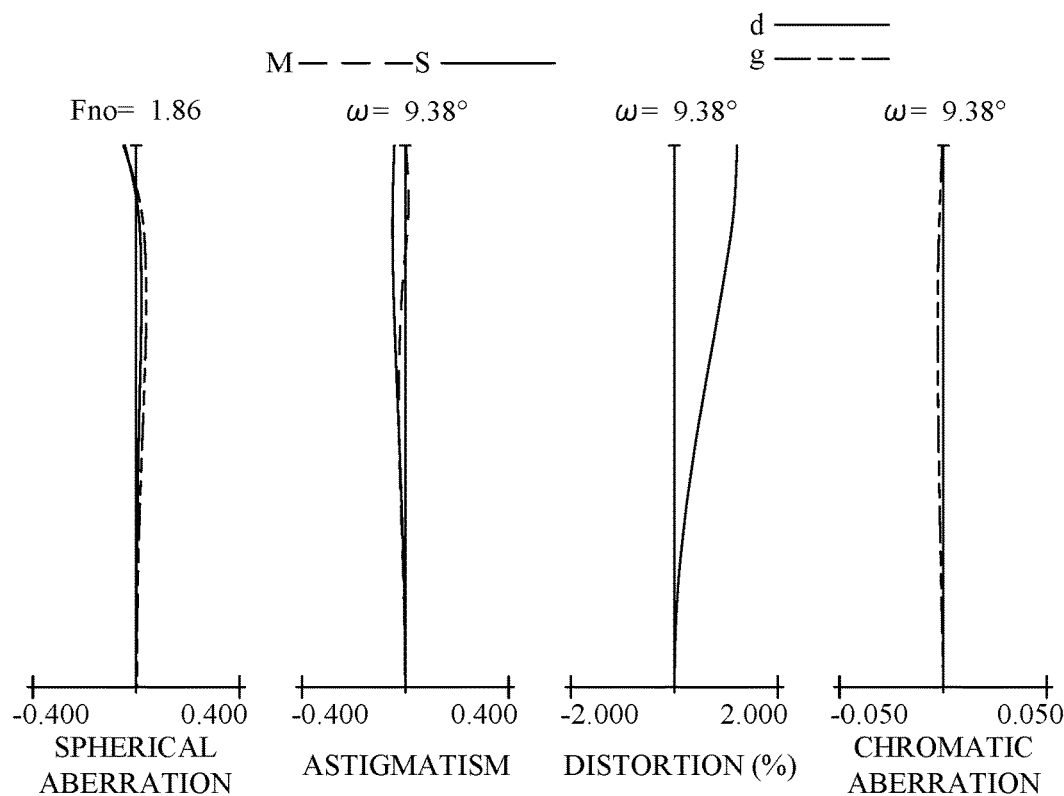
FIGS. 8A and 8B are aberration diagrams of the optical system according to Example 4 in the in-focus state on the infinity object and in an in-focus state on the closest object, respectively.
Figure 8B:
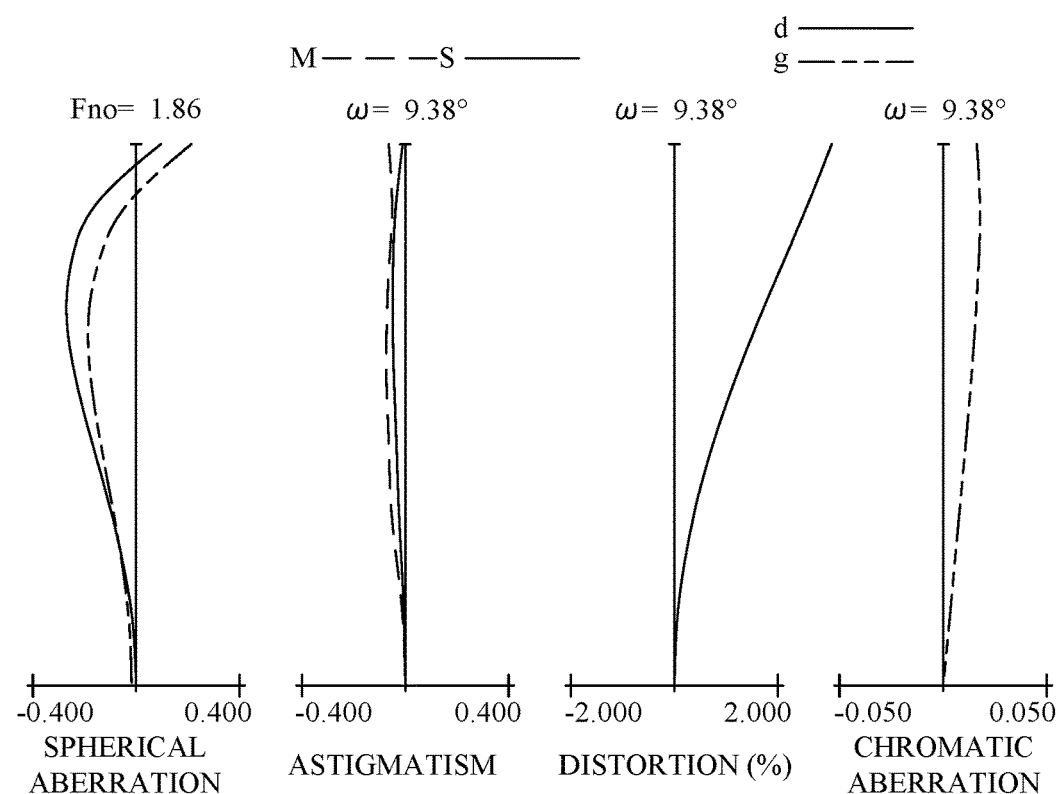

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, and 7 are sectional views of optical systems according to Examples 1 to 4 in an in-focus state on an infinity object (an object at infinity), respectively. The optical system according to each example is an optical system for use with an image pickup apparatus such as a digital video camera, a digital still camera, a broadcast camera, a film-based camera, a surveillance camera, and an in-vehicle camera.

In each sectional view, a left side is an object side and a right side is an image side. The optical system according to each example includes a plurality of lens units. In this specification, a lens unit is a group of lenses that integrally move or stand still during focusing. That is, in the optical system according to each example, a distance between adjacent lens units changes during focusing. The lens unit may include one or more lenses.

The optical system according to each example includes, in order from the object side to the image side, a first lens unit L1 having positive refractive power, an aperture stop (or a diaphragm) SP, a second lens unit L2 including a negative lens and having negative refractive power, and a third lens unit L3 having positive refractive power. The refractive power is an optical power and expressed by a reciprocal of the focal length.

IP denotes an image plane, and in a case where the optical system according to each example is used as an imaging optical system for a digital still camera or a digital video camera, an imaging plane of a solid-state image sensor (photoelectric conversion element) such as a CCD sensor or a CMOS sensor is placed on the image plane IP. In a case where the optical system according to each example is used as an imaging optical system for a film-based camera, a photosensitive plane corresponding to the film plane is placed on the image plane IP. GB denotes an optical filter disposed on the object side of the image plane IP.

An arrow in the optical axis direction illustrated in each sectional view represents a moving direction of a lens unit (focus unit) during focusing from the infinity object to the closest object. In the optical system according to each example, the second lens unit L2 serves as the focus unit configured to move toward the image side during focusing from the infinity object to the closest object. The first lens unit L1 and the third lens unit L3 do not move (or are fixed) during focusing from the infinity object to the closest object.

FIGS. 2A, 2B, 4A, 4B, 6A, 6B, 8A, and 8B are aberration diagrams of the optical systems according to Examples 1 to 4, respectively. In each aberration diagram, FIGS. 2A, 4A, 6A, and 8A are aberration diagrams of the optical systems in the in-focus state on the infinity object, and FIGS. 2B, 4B, 6B, and 8B are aberration diagrams of the optical systems in the in-focus state on the closest object.

In a spherical aberration diagram, Fno denotes an F-number, which indicates spherical aberration amounts for the d-line (wavelength 587.6 nm) and g-line (wavelength 435.8 nm). In an astigmatism diagram, S denotes an astigmatism amount on a sagittal image plane, and M denotes an astigmatism amount on a meridional image plane. A distortion diagram illustrates a distortion amount for the d-line. A chromatic aberration diagram illustrates a chromatic aberration amount for the g-line. ω denotes an imaging half angle of view (degrees).

A description will now be given of the characteristic configuration of the optical system according to each example.

The third lens unit L3 includes, in order from the object side to the image side, a first subunit L3a having positive refractive power, a second subunit L3b having negative refractive power, and a third subunit L3c having positive refractive power. The second subunit L3b is set to an image stabilizing unit, which is moved in a direction including a component orthogonal to the optical axis as illustrated in each sectional view during image stabilization. This configuration can correct the fluctuation of the image position caused by the vibration of the optical system.

The optical system according to each example satisfies the following inequalities (1) and (2):

$$1.85 < N3b\_ave \quad (1)$$

$$f3b/f < -0.25 \quad (2)$$

where N3b_ave is an average value of refractive indices of all lenses included in the second subunit L3b, f3b is a focal length of the second subunit L3b, and f is a focal length of the optical system.

Inequality (1) defines the average value of the refractive indices of all the lenses included in the second subunit L3b serving as the image stabilizing unit. In a case where the value is lower than the lower limit of inequality (1), the Petzval sum of the second subunit L3b increases and deteriorates the tilt of the image plane during image stabilization, and it becomes difficult to secure image stabilizing performance.

Inequality (2) defines a ratio between the focal length of the second subunit L3b serving as the image stabilizing unit, and the focal length of the optical system. In a case where the value is higher than the upper limit of inequality (2), the Petzval sum of the second subunit L3b increases and deteriorates the tilt of the image plane during image stabilization, and it becomes difficult to secure image stabilizing performance.

The optical system according to each example has the above configuration, and thus can satisfactorily correct the Petzval sum of the second subunit L3b. Therefore, the image stabilizing performance can be secured even in a case where the second subunit L3b is placed close to the image plane, and an optical system including the image stabilizing unit can achieve both miniaturization and high image stabilizing performance.

Four or more lens units can provide similar effects by satisfying the above configuration.

Inequalities (1) and (2) may be replaced with inequalities (1a) and (2a) below.

$$1.87 < N3b\_ave < 2.15 \quad (1a)$$

$$-0.60 < f3b/f < -0.29 \quad (2a)$$

In a case where the value is higher than the upper limit of inequality (1a), it becomes difficult to manufacture the second subunit L3b. In a case where the value is lower than the lower limit of inequality (2a), the moving amount of the second subunit L3b during image stabilization increases, and the optical effective diameter increases.

Inequalities (1) and (2) may be replaced with inequalities (1b) and (2b) below.

$$1.90 < N3b\_ave < 2.05 \quad (1b)$$

$$-0.56 < f3b/f < -0.33 \quad (2b)$$

A description will now be given of the configuration that may be satisfied by the optical system according to each example.

The second subunit L3b as the image stabilizing unit may include a positive lens and a negative lens.

A surface on the image side of the negative lens included in the second lens unit L2 may have a concave shape.

The first subunit L3a may be a cemented lens of a negative lens and a positive lens.

A description will now be given of conditions that the optical system according to each example may satisfy. The optical system according to each example may satisfy one or more of the following inequalities (3) to (8):

$$3.8 < f1/BF < 7.0 \quad (3)$$

$$-5.5 < f2/BF < -2.5 \quad (4)$$

$$5.0 < f3/BF < 8.5 \quad (5)$$

$$2.5 < LDis/BF < 6.5 \quad (6)$$

$$0.0 < LD/f < 1.5 \quad (7)$$

$$0.0 < BF/f < 0.2 \quad (8)$$

Here, f1 is a focal length of the first lens unit L1. BF is a distance on the optical axis from the lens surface closest to the image plane of the optical system to the image plane (referred to as back focus hereinafter). f2 is a focal length of the second lens unit L2. f3 is a focal length of the third lens unit L3. LDis is a distance on the optical axis from the lens surface closest to the object of the second subunit L3b as the image stabilizing unit to the image plane. LD is a distance on the optical axis from the lens surface closest to the object of the optical system to the image plane (referred to as an overall lens length hereinafter). The distances LDis and LD for back focal distances are air-converted distances.

Inequality (3) defines a ratio between the focal length of the first lens unit L1 and the back focus. In a case where the value is lower than the lower limit of inequality (3), the refractive power of the first lens unit L1 increases. This is beneficial for shortening the overall lens length, but it becomes difficult to correct spherical aberration and longitudinal chromatic aberration. In a case where the value is higher than the upper limit of inequality (3), the refractive power of the first lens unit L1 becomes small and the overall lens length becomes long.

Inequality (4) defines a ratio between the focal length of the second lens unit L2 as the focus unit and the back focus. In a case where the value is lower than the lower limit of inequality (4), the focus sensitivity of the second lens unit L2 (a focus moving amount relative to a moving amount of the focus unit) becomes small, and the overall lens length becomes long. In a case where the value is higher than the upper limit of inequality (4), the refractive power of the second lens unit L2 increases, the focusing sensitivity of the second lens unit L2 increases, and it becomes difficult to satisfy the optical performance during focusing.

Inequality (5) defines a ratio between the focal length and the back focus of the third lens unit L3. In a case where the value is lower than the lower limit of inequality (5), the refractive power of the third lens unit L3 increases. This is beneficial for shortening the overall lens length, but it becomes difficult to correct lateral chromatic aberration. In a case where the value is higher than the upper limit of inequality (5), the refractive power of the third lens unit L3 becomes small and the overall lens length becomes long.

Inequality (6) defines a ratio between the distance on the optical axis from the lens surface closest to the object of the second subunit L3b to the image plane and the back focus. In a case where the value is lower than the lower limit of inequality (6) and the distance on the optical axis from the surface closest to the object of the second subunit L3b to the image plane becomes short, it becomes difficult to secure the image stabilizing performance. In a case where the value is higher than the upper limit of inequality (6) and the distance on the optical axis from the lens surface closest to the object of the second subunit L3b to the image plane becomes long, it becomes difficult to secure the image stabilizing performance.

Inequality (7) defines a ratio between the overall lens length and the focal length of the optical system. Satisfying inequality (7) means that it is a so-called medium telephoto type optical system to a so-called telephoto type optical system.

Inequality (8) defines a ratio between the back focus and the focal length of the optical system. In a case where the value is lower than the lower limit of inequality (8), it becomes difficult to dispose the optical elements. In a case where the value is higher than the upper limit of inequality (8), the overall lens length becomes long.

Inequalities (3) to (8) may be replaced with inequalities (3a) to (8a) below.

$$4.3 < f1/BF < 6.5 \tag{3a}$$

$$-5.0 < f2/BF < -3.0 \tag{4a}$$

$$5.5 < f3/BF < 8.0 \tag{5a}$$

$$3.0 < LDis/BF < 5.5 \tag{6a}$$

$$0.5 < LD/f < 1.3 \tag{7a}$$

$$0.05 < BF/f < 0.17 \tag{8a}$$

Inequalities (3) to (8) may be replaced with inequalities (3b) to (8b) below.

$$4.8 < f1/BF < 6.0 \tag{3b}$$

$$-4.4 < f2/BF < -3.4 \tag{4b}$$

$$6.0 < f3/BF < 7.6 \tag{5b}$$

$$3.5 < LDis/BF < 4.5 \tag{6b}$$

$$1.0 < LD/f < 1.15 \tag{7b}$$

$$0.10 < BF/f < 0.14 \tag{8b}$$

Numerical examples 1 to 4 corresponding to Examples 1 to 4, respectively, are illustrated below.

In surface data according to each numerical example, r denotes a radius of curvature of each optical surface, and d (mm) denotes an on-axis distance (distance on the optical axis) between an m-th surface and an (m+1)-th surface, where m is a surface number counted from the light incident side. nd denotes a refractive index of the optical element for the d-line, and vd denotes an Abbe number of the optical element. The Abbe number vd of a certain material is expressed as follows:

$$vd=(Nd-1)/(NF-NC)$$

where Nd, NF, and NC are refractive indexes for the d-line (587.6 nm), the F-line (486.1 nm), and the C-line (656.3 nm) in the Fraunhofer line, respectively.

In each numerical example, each of d, focal length (mm), F-number, and half angle of view (degrees) has a value in a case where the optical system L0 according to each example is in focus on the infinity object. The "back focus" is a distance on the optical axis from the final lens surface (lens surface closest to the image plane) to a paraxial image surface converted into an air-converted length. An "overall lens length" is a length obtained by adding the back focus to a distance on the optical axis from the frontmost surface (lens surface closest to the object) of the optical system to the final surface. The term "lens unit" includes one or more lenses.

Numerical Example 1

UNIT: mm
Surface Data

| Surface No. | r | d | nd | vd |
|---|---|---|---|---|
| 1 | 76.412 | 7.34 | 1.84666 | 23.8 |
| 2 | 213.413 | 0.18 | | |
| 3 | 66.920 | 8.15 | 1.49700 | 81.5 |
| 4 | 229.514 | 0.51 | | |
| 5 | 44.701 | 11.30 | 1.49700 | 81.5 |
| 6 | 281.899 | 1.98 | 1.77047 | 29.7 |
| 7 | 33.027 | 4.18 | | |
| 8 | 55.707 | 9.03 | 1.49700 | 81.5 |
| 9 | -100.128 | 1.58 | 1.77047 | 29.7 |
| 10 | 4662.497 | 2.47 | | |
| 11(Aperture Stop) | ∞ | (Variable) | | |
| 12 | 1897.391 | 1.36 | 1.61800 | 63.4 |
| 13 | 40.127 | (Variable) | | |
| 14 | 163.663 | 1.09 | 1.92286 | 20.9 |
| 15 | 35.445 | 5.47 | 1.80400 | 46.5 |
| 16 | -151.559 | 1.79 | | |
| 17 | -456.177 | 1.66 | 1.92286 | 20.9 |
| 18 | -112.728 | 0.49 | | |
| 19 | -181.567 | 1.00 | 1.90043 | 37.4 |
| 20 | 60.351 | 1.95 | | |
| 21 | 46.245 | 6.03 | 1.60311 | 60.6 |
| 22 | -57.425 | 1.12 | 1.85025 | 30.1 |
| 23 | 795.125 | 8.37 | | |
| 24 | 200.726 | 6.27 | 2.00069 | 25.5 |
| 25 | -51.399 | 0.24 | | |
| 26 | -67.989 | 1.34 | 1.70154 | 41.2 |
| 27 | 26.381 | 8.87 | 1.78470 | 26.3 |
| 28 | 618.647 | 8.59 | | |
| 29 | -34.376 | 1.35 | 1.49700 | 81.5 |
| 30 | -143.287 | 15.66 | | |

-continued

UNIT: mm
Surface Data

| | | | | |
|---|---|---|---|---|
| 31 | ∞ | 1.50 | 1.51633 | 64.1 |
| 32 | ∞ | 0.80 | | |
| Image Plane | ∞ | | | |

| | |
|---|---|
| Focal Length | 130.98 |
| FNO | 1.85 |
| Half Angle of View (°) | 9.38 |
| Image Height | 21.64 |
| Overall lens length | 147.99 |
| BF | 17.45 |

| | In-Focus on Infinity Object | In-Focus on Closest Object |
|---|---|---|
| d11 | 2.47 | 22.93 |
| d13 | 24.40 | 3.94 |

Numerical Example 2

UNIT: mm
Surface Data

| Surface No. | r | d | nd | vd |
|---|---|---|---|---|
| 1 | 76.578 | 7.36 | 1.84666 | 23.8 |
| 2 | 220.228 | 0.18 | | |
| 3 | 68.777 | 7.87 | 1.49700 | 81.5 |
| 4 | 233.411 | 0.20 | | |
| 5 | 43.359 | 11.52 | 1.49700 | 81.5 |
| 6 | 234.472 | 1.97 | 1.77047 | 29.7 |
| 7 | 32.656 | 3.99 | | |
| 8 | 52.867 | 9.51 | 1.49700 | 81.5 |
| 9 | -92.081 | 1.55 | 1.77047 | 29.7 |
| 10 | 14913.980 | 2.35 | | |
| 11(Aperture Stop) | ∞ | (Variable) | | |
| 12 | -6588.904 | 1.31 | 1.61800 | 63.4 |
| 13 | 37.972 | (Variable) | | |
| 14 | 116.582 | 1.04 | 1.92286 | 20.9 |
| 15 | 37.606 | 5.88 | 1.80400 | 46.5 |
| 16 | -89.690 | 1.73 | | |
| 17 | -134.294 | 1.68 | 1.92286 | 20.9 |
| 18 | -69.108 | 0.27 | | |
| 19 | -96.497 | 0.93 | 1.91082 | 35.3 |
| 20 | 46.234 | 1.91 | | |
| 21 | 40.954 | 7.17 | 1.62299 | 58.2 |
| 22 | -28.195 | 1.10 | 1.85025 | 30.1 |
| 23 | -288.205 | 8.98 | | |
| 24 | 194.608 | 5.20 | 2.00069 | 25.5 |
| 25 | -48.820 | 0.29 | | |
| 26 | -92.179 | 1.33 | 1.69680 | 55.5 |
| 27 | 27.408 | 6.89 | 1.78470 | 26.3 |
| 28 | 139.643 | 8.44 | | |
| 29 | -28.960 | 1.35 | 1.49700 | 81.5 |
| 30 | -84.097 | 15.68 | | |
| 31 | ∞ | 1.50 | 1.51633 | 64.1 |
| 32 | ∞ | 0.80 | | |
| Image Plane | ∞ | | | |

| | |
|---|---|
| Focal Length | 130.88 |
| FNO | 1.85 |
| Half Angle of View (°) | 9.39 |
| Image Height | 21.64 |
| Overall lens length | 143.74 |
| BF | 17.48 |

| | In-Focus on Infinity Object | In-Focus on Closest Object |
|---|---|---|
| d11 | 2.33 | 20.36 |
| d13 | 21.92 | 3.89 |

Numerical Example 3

UNIT: mm
Surface Data

| Surface No. | r | d | nd | vd |
|---|---|---|---|---|
| 1 | 86.498 | 6.69 | 1.92286 | 20.9 |
| 2 | 235.625 | 0.20 | | |
| 3 | 60.577 | 8.82 | 1.49700 | 81.5 |
| 4 | 168.618 | 0.55 | | |
| 5 | 52.534 | 9.97 | 1.49700 | 81.5 |
| 6 | 275.648 | 3.08 | 1.78472 | 25.7 |
| 7 | 34.757 | 2.85 | | |
| 8 | 46.066 | 10.13 | 1.49700 | 81.5 |
| 9 | -139.533 | 2.20 | 1.80610 | 33.3 |
| 10 | -826.909 | 3.30 | | |
| 11(Aperture Stop) | ∞ | (Variable) | | |
| 12 | -5044.109 | 1.28 | 1.59349 | 67.0 |
| 13 | 36.577 | (Variable) | | |
| 14 | 99.290 | 1.28 | 1.94594 | 18.0 |
| 15 | 40.678 | 4.71 | 1.65160 | 58.5 |
| 16 | -208.565 | 1.80 | | |
| 17 | -235.148 | 2.58 | 1.94594 | 18.0 |
| 18 | -56.256 | 0.95 | | |
| 19 | -61.190 | 1.16 | 2.00100 | 29.1 |
| 20 | 73.431 | 2.00 | | |
| 21 | 44.132 | 8.83 | 1.80400 | 46.5 |
| 22 | -36.777 | 1.40 | 1.80000 | 29.8 |
| 23 | 62.842 | 4.54 | | |
| 24 | 51.842 | 7.88 | 1.80518 | 25.5 |
| 25 | -72.292 | 0.20 | | |
| 26 | -157.559 | 1.72 | 1.49700 | 81.5 |
| 27 | 38.035 | 3.34 | | |
| 28 | 48.774 | 3.41 | 1.92286 | 20.9 |
| 29 | 115.741 | 11.05 | | |
| 30 | -26.930 | 1.64 | 1.62299 | 58.2 |
| 31 | -46.796 | 13.00 | | |
| 32 | ∞ | 1.50 | 1.51633 | 64.1 |
| 33 | ∞ | 0.80 | | |
| Image Plane | ∞ | | | |

| | |
|---|---|
| Focal Length | 131.00 |
| FNO | 1.85 |
| Half Angle of View (°) | 9.38 |
| Image Height | 21.64 |
| Overall lens length | 147.99 |
| BF | 14.79 |

| | In-Focus on Infinity Object | In-Focus on Closest Object |
|---|---|---|
| d11 | 3.05 | 20.04 |
| d13 | 22.60 | 5.61 |

Numerical Example 4

UNIT: mm
Surface Data

| Surface No. | r | d | nd | vd |
|---|---|---|---|---|
| 1 | 82.715 | 6.98 | 1.84666 | 23.8 |
| 2 | 245.193 | 0.35 | | |
| 3 | 62.217 | 9.16 | 1.49700 | 81.5 |
| 4 | 223.597 | 0.55 | | |
| 5 | 56.551 | 10.42 | 1.49700 | 81.5 |
| 6 | 799.841 | 3.59 | 1.77047 | 29.7 |
| 7 | 33.661 | 1.89 | | |
| 8 | 40.413 | 10.28 | 1.49700 | 81.5 |
| 9 | -185.049 | 1.90 | 1.77047 | 29.7 |
| 10 | 798.092 | 3.38 | | |
| 11(Aperture Stop) | ∞ | (Variable) | | |
| 12 | ∞ | 1.35 | 1.61800 | 63.4 |
| 13 | 38.615 | (Variable) | | |

-continued

UNIT: mm
Surface Data

| 14 | 157.599 | 1.25 | 1.92286 | 20.9 |
| 15 | 47.803 | 4.60 | 1.80400 | 46.5 |
| 16 | −142.411 | 1.80 | | |
| 17 | −295.214 | 2.08 | 1.92286 | 20.9 |
| 18 | −73.431 | 0.97 | | |
| 19 | −88.195 | 1.00 | 1.91082 | 35.3 |
| 20 | 54.928 | 3.89 | | |
| 21 | 40.006 | 9.01 | 1.60311 | 60.6 |
| 22 | −50.592 | 1.50 | 1.84666 | 23.8 |
| 23 | 797.299 | 4.02 | | |
| 24 | 197.831 | 6.50 | 2.00069 | 25.5 |
| 25 | −52.908 | 1.50 | | |
| 26 | −59.824 | 1.60 | 1.65844 | 50.9 |
| 27 | 31.679 | 7.95 | 1.80518 | 25.5 |
| 28 | 207.181 | 8.55 | | |
| 29 | −28.564 | 1.60 | 1.58913 | 61.1 |
| 30 | −50.386 | 12.63 | | |
| 31 | ∞ | 1.50 | 1.51633 | 64.1 |
| 32 | ∞ | 0.80 | | |
| Image Plane | ∞ | | | |

| Focal Length | 130.95 |
| FNO | 1.86 |
| Half Angle of View (°) | 9.38 |
| Image Height | 21.64 |
| Overall lens length | 148.55 |
| BF | 14.42 |

| | In-Focus on Infinity Object | In-Focus on Closest Object |
| --- | --- | --- |
| d11 | 2.45 | 20.66 |
| d13 | 24.03 | 5.82 |

Table 1 below summarizes various values in each numerical example.

TABLE 1

| | | Ex. 1 | Ex. 2 | Ex. 3 | Ex. 4 |
| --- | --- | --- | --- | --- | --- |
| | f | 130.98 | 130.88 | 131.00 | 130.95 |
| | Fno | 1.85 | 1.85 | 1.85 | 1.86 |
| | f1 | 89.59 | 85.64 | 82.86 | 85.14 |
| | f2 | −66.35 | −61.09 | −61.18 | −62.48 |
| | f3 | 105.03 | 107.28 | 109.70 | 109.52 |
| | f3b | −73.17 | −44.00 | −59.08 | −57.88 |
| | LD | 147.99 | 143.74 | 147.99 | 148.55 |
| | LDis | 61.55 | 60.13 | 60.80 | 60.53 |
| | BF | 17.45 | 17.48 | 14.79 | 14.42 |
| Inequality (1) | N3b_ave | 1.912 | 1.917 | 1.973 | 1.917 |
| Inequality (2) | f3b/f | −0.559 | −0.336 | −0.451 | −0.442 |
| Inequality (3) | f1/BF | 5.14 | 4.90 | 5.60 | 5.91 |
| Inequality (4) | f2/BF | −3.80 | −3.50 | −4.14 | −4.33 |
| Inequality (5) | f3/BF | 6.02 | 6.14 | 7.42 | 7.60 |
| Inequality (6) | LDis/BF | 3.708 | 3.606 | 4.427 | 4.479 |
| Inequality (7) | LD/f | 1.130 | 1.098 | 1.130 | 1.134 |
| Inequality (8) | BF/f | 0.133 | 0.134 | 0.113 | 0.110 |

Image Pickup Apparatus

Figure 9:
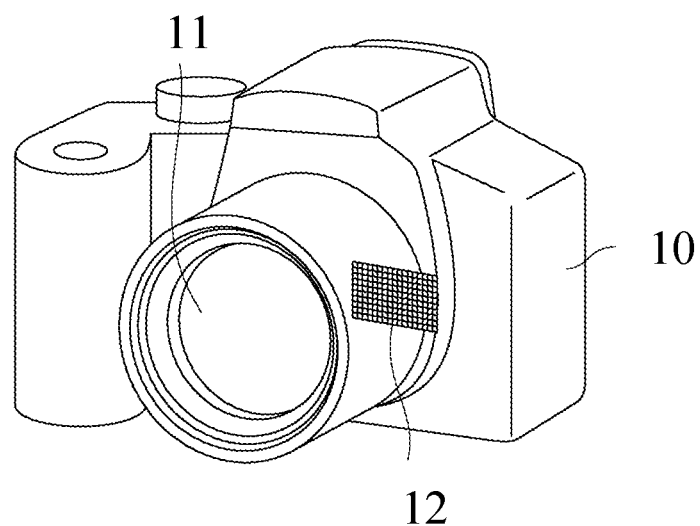
FIG. 9 is a schematic diagram of an image pickup apparatus.

Referring now to FIG. 9, a description will be given of an example of a digital still camera (image pickup apparatus) using the optical system according to each example. In FIG. 9, reference numeral 10 denotes a camera body, and reference numeral 11 denotes the optical system according to any one of Examples 1 to 4. Reference numeral 12 denotes an image sensor (photoelectric conversion device) such as a CCD sensor or CMOS sensor, which is built in the camera body 10 and receives and photoelectrically converts an optical image formed by the optical system 11. The camera body 10 may be a so-called single-lens reflex camera having a quick turn mirror, or a so-called mirrorless camera having no quick turn mirror.

Applying the optical system according to each example to an image pickup apparatus such as a digital still camera can provide an image pickup apparatus having a small lens.

Each of the above examples can provide an optical system that includes an image stabilizing unit and achieves both miniaturization and high image stabilizing performance, and an image pickup apparatus having the same.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000018, filed on Jan. 1, 2022, which is hereby incorporated by reference herein in its entirety.

What is claimed is:

1. An optical system comprising, in order from an object side to an image side, a first lens unit having positive refractive power, a second lens unit having negative refractive power, and a third lens unit having positive refractive power,
   wherein each distance between adjacent lens units changes during focusing,
   wherein during focusing from an infinity object to the closest object, the first and third lens units do not move and the second lens unit moves toward the image side,
   wherein the third lens unit consists of, in order from the object side to the image side, a first subunit having positive refractive power, a second subunit having negative refractive power, and a third subunit having positive refractive power,
   wherein the second subunit moves in a direction including a component in a direction orthogonal to an optical axis during image stabilization,
   wherein the second subunit includes a positive lens and a negative lens, and
   wherein the following inequalities are satisfied:

$1.90 < N3b\_ave$ $f3b/f < -0.25$ $2.5 < LDis/BF < 6.5$ where N3b_ave is an average value of refractive indices of all lenses included in the second subunit, f3b is a focal length of the second subunit, f is a focal length of the optical system, LDis is a distance on the axis from a lens surface closest to an object in the second subunit to an image plane, and BF is a distance on the axis from a lens surface closest to the image plane of the system to the image plane.

2. The optical system according to claim 1, wherein the following inequality is satisfied:

$1.85 < N3b\_ave < 2.15$.

3. The optical system according to claim 1, wherein the following inequality is satisfied:

$-0.60 < f3b/f < -0.25$.

4. The optical system according to claim 1, wherein the following inequality is satisfied:

$3.8 < f1/BF < 7.0$ where f1 is a focal length of the first lens unit.

5. The optical system according to claim 1, wherein the following inequality is satisfied:

$-5.5 < f2/BF < -2.5$ where f2 is a focal length of the second lens unit.

6. The optical system according to claim 1, wherein the following inequality is satisfied:

$$5.0 < f3/BF < 8.5$$

where f3 is a focal length of the third lens unit.

7. The optical system according to claim 1, wherein the following inequality is satisfied:

$$LD/f < 1.5$$

where LD is a distance on the axis from a lens surface closest to an object of the system to an image plane.

8. The optical system according to claim 1, wherein the following inequality is satisfied:

$$BF/f < 0.2.$$

9. The optical system according to claim 1, wherein the second lens unit consists of a negative lens.

10. The optical system according to claim 1, wherein a surface on the image side of the negative lens included in the second lens unit has a concave shape.

11. The optical system according to claim 1, further comprising an aperture stop disposed between the first lens unit and the second lens unit.

12. The optical system according to claim 1, wherein the first subunit is a cemented lens of a negative lens and a positive lens.

13. An apparatus comprising:
a system; and
a sensor configured to receive an image formed by the system,
wherein the system includes, in order from an object side to an image side, a first lens unit having positive refractive power, a second lens unit having negative refractive power, and a third lens unit having positive refractive power,
wherein each distance between adjacent lens units changes during focusing,
wherein during focusing from an infinity object to the closest object, the first and third lens units do not move and the second lens unit moves toward the image side,
wherein the third lens unit consists of, in order from the object side to the image side, a first subunit having positive refractive power, a second subunit having negative refractive power, and a third subunit having positive refractive power,
wherein the second subunit moves in a direction including a component in a direction orthogonal to an optical axis during image stabilization,
wherein the second subunit includes a positive lens and a negative lens, and
wherein the following inequalities are satisfied:

$$1.90 < N3b\_ave$$

$$f3b/f < -0.25$$

$$2.5 < LDis/BF < 6.5$$

where N3b_ave is an average value of refractive indices of all lenses included in the second subunit, f3b is a focal length of the second subunit, and f is a focal length of the system, LDis is a distance on the axis from a lens surface closest to an object in the second subunit to an image plane, and BF is a distance on the axis from a lens surface closest to the image plane of the system to the image plane.

14. The apparatus according to claim 13, wherein the following inequality is satisfied:

$$1.85 < N3b\_ave < 2.15.$$

15. The apparatus according to claim 13, wherein the following inequality is satisfied:

$$-0.60 < f3b/f < -0.25.$$

16. The apparatus according to claim 13, wherein the following inequality is satisfied:

$$3.8 < f1/BF < 7.0$$

where f1 is a focal length of the first lens unit.

17. The apparatus according to claim 13, wherein the following inequality is satisfied:

$$-5.5 < f2/BF < -2.5$$

where f2 is a focal length of the second lens unit.

18. The apparatus according to claim 13, wherein the following inequality is satisfied:

$$5.0 < f3/BF < 8.5$$

where f3 is a focal length of the third lens unit.

19. An optical system comprising, in order from an object side to an image side, a first lens unit having positive refractive power, a second lens unit having negative refractive power, and a third lens unit having positive refractive power,
wherein each distance between adjacent lens units changes during focusing,
wherein during focusing from an infinity object to the closest object, the first and third lens units do not move and the second lens unit moves toward the image side,
wherein the third lens unit consists of, in order from the object side to the image side, a first subunit having positive refractive power, a second subunit having negative refractive power, and a third subunit having positive refractive power,
wherein the second subunit moves in a direction including a component in a direction orthogonal to an optical axis during image stabilization,
wherein the second subunit includes a positive lens and a negative lens, and
wherein the following inequalities are satisfied:

$$1.90 < N3b\_ave$$

$$f3b/f < -0.25$$

$$3.8 < f1/BF < 7.0$$

where N3b_ave is an average value of refractive indices of all lenses included in the second subunit, f3b is a focal length of the second subunit, f is a focal length of the optical system, f1 is a focal length of the first lens unit, and BF is a distance on the axis from a lens surface closest to an image plane of the system to the image plane.

20. An optical system comprising, in order from an object side to an image side, a first lens unit having positive refractive power, a second lens unit having negative refractive power, and a third lens unit having positive refractive power,
wherein each distance between adjacent lens units changes during focusing,
wherein during focusing from an infinity object to the closest object, the first and third lens units do not move and the second lens unit moves toward the image side,
wherein the third lens unit consists of, in order from the object side to the image side, a first subunit having positive refractive power, a second subunit having negative refractive power, and a third subunit having positive refractive power, wherein the second subunit moves in a direction including a component in a direction orthogonal to an optical axis during image stabilization, wherein the second subunit includes a positive lens and a negative lens, and wherein the following inequalities are satisfied:

$$1.90 < N3b\_ave$$

$$f3b/f < -0.25$$

$$-5.5 < f2/BF < 6.5$$

where N3b_ave is an average value of refractive indices of all lenses included in the second subunit, f3b is a focal length of the second subunit, f is a focal length of the optical system, f2 is a focal length of the second lens unit, and BF is a distance on the axis from a lens surface closest to an image plane of the system to the image plane.

21. An optical system comprising, in order from an object side to an image side, a first lens unit having positive refractive power, a second lens unit having negative refractive power, and a third lens unit having positive refractive power, wherein each distance between adjacent lens units changes during focusing, wherein during focusing from an infinity object to the closest object, the first and third lens units do not move and the second lens unit moves toward the image side, wherein the third lens unit consists of, in order from the object side to the image side, a first subunit having positive refractive power, a second subunit having negative refractive power, and a third subunit having positive refractive power, wherein the second subunit moves in a direction including a component in a direction orthogonal to an optical axis during image stabilization, wherein the second subunit includes a positive lens and a negative lens, and wherein the following inequalities are satisfied:

$$1.90 < N3b\_ave$$

$$f3b/f < -0.25$$

$$5.0 < f3/BF < 8.5$$

where N3b_ave is an average value of refractive indices of all lenses included in the second subunit, f3b is a focal length of the second subunit, f is a focal length of the optical system, f3 is a focal length of the third lens unit, and BF is a distance on the axis from a lens surface closest to an image plane of the system to the image plane.

* * * * *